United States Patent Office 3,014,331
Patented Dec. 26, 1961

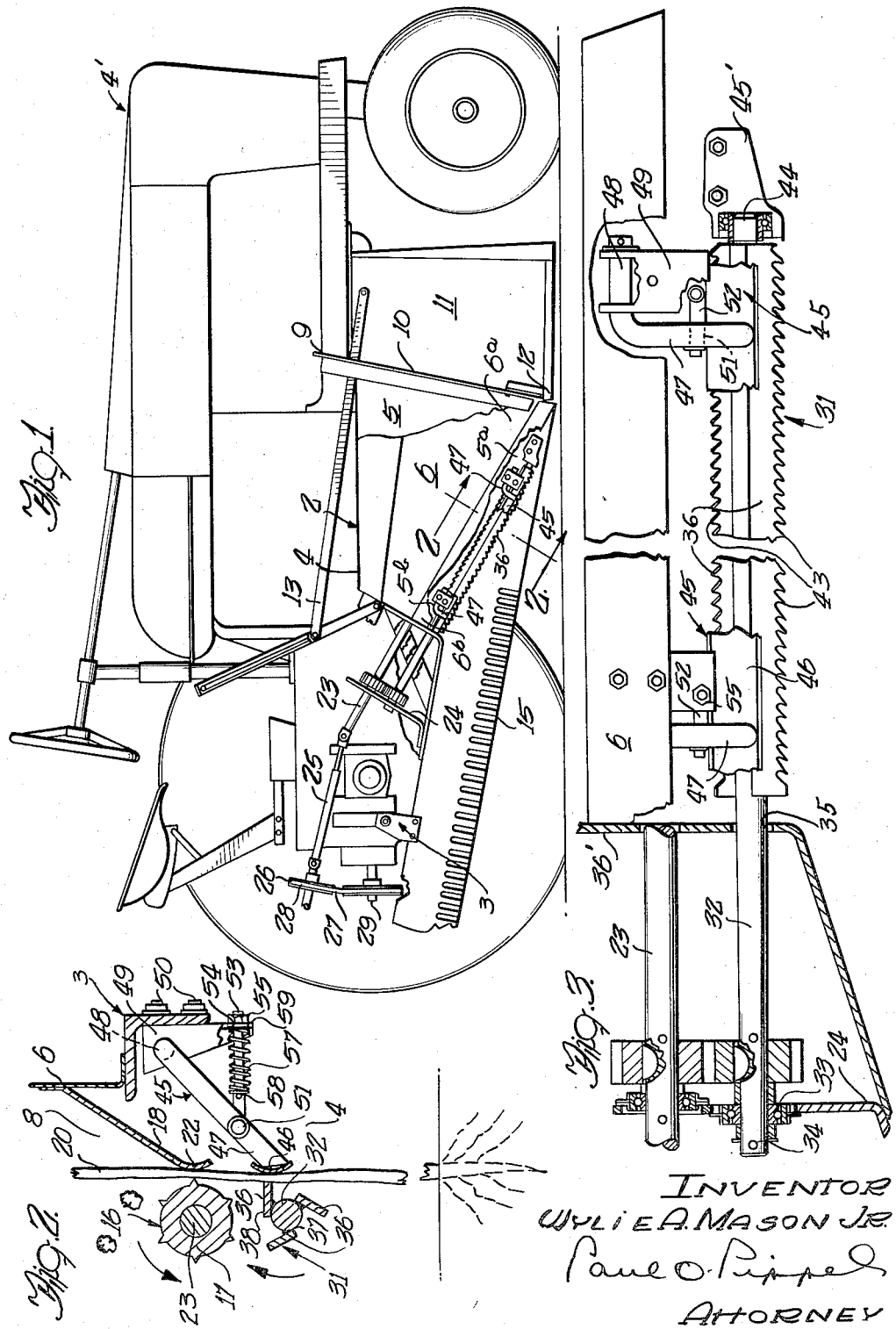

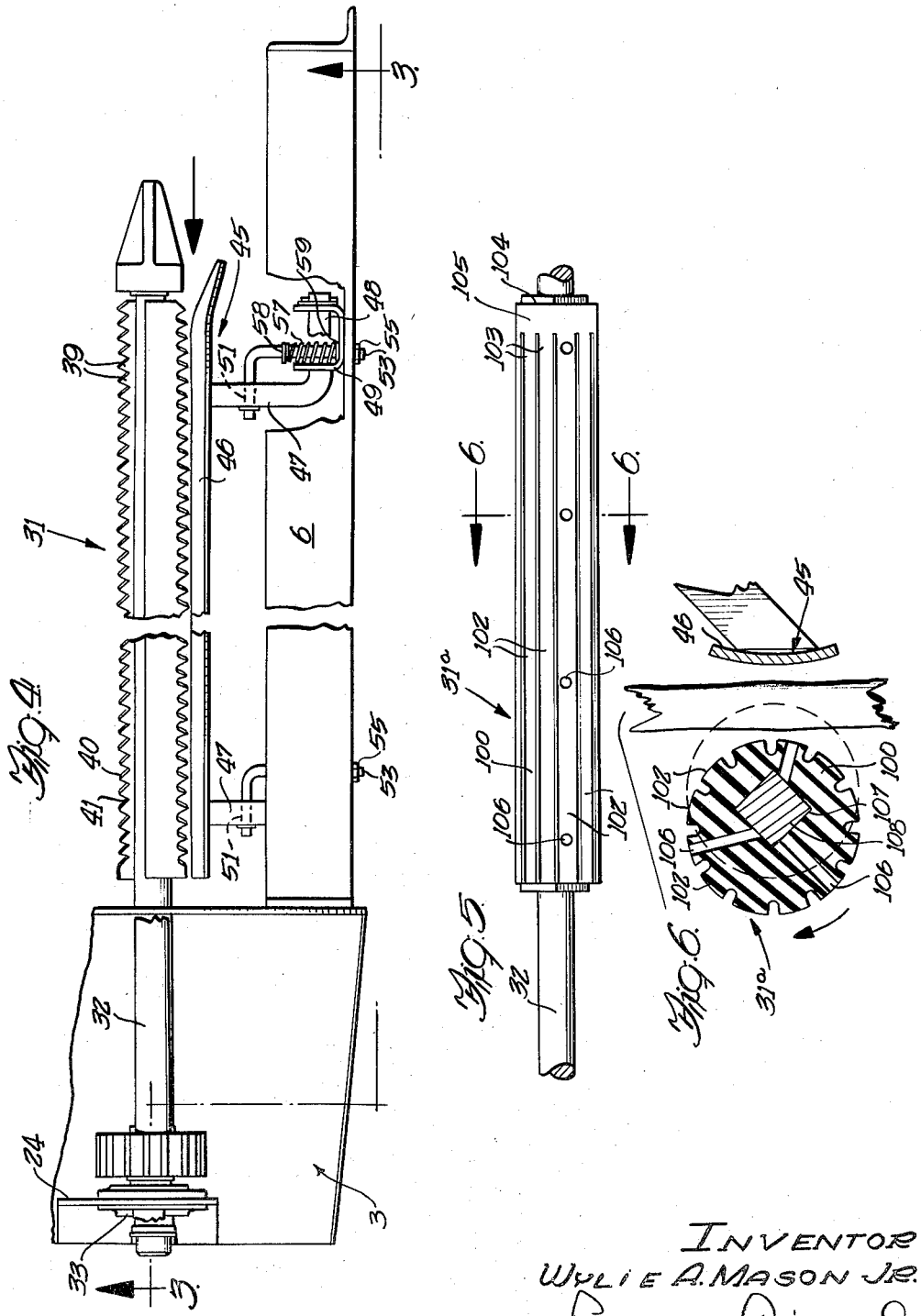

3,014,331
STALK WALKER ATTACHMENT FOR
COTTON STRIPPERS
Wylie A. Mason, Jr., Los Angeles, Calif., assignor to International Harvester Company, Chicago, Ill., a corporation of New Jersey
Filed Nov. 28, 1958, Ser. No. 777,063
8 Claims. (Cl. 56—33)

This invention relates to a harvester and more particularly to an anti-clogging device for a cotton stripper.

The instant invention is of a particular type which is adaptable for use with a cotton stripper which includes a pair of transversely spaced apart side panels or supports defining a fore and aft extending plant receiving passageway in which row-planted crops are received as the machine moves along the field. The harvesting mechanism is of the type which includes a pair of cooperative members disposed in side by side relation along the passageway and wherein at least one of the members includes an upwardly rotating stripping roll which is operative to detach crops from the stalks of the cotton plants received in the passageway, the stalks remaining attached to the ground. In certain conditions of operation of the machine, particularly where root rot occurs, the stalk is readily severed from the root by the upward force exerted by the harvesting device which strips upwardly thus tending to pull the stalks from the ground and are drawn into the harvesting mechanism and then clog the unit. Various devices, of course, are known to preevnt uprooting. However, these means are generally complicated and usually are either a specific part of the machine so that the farmer who does not need the structure is forced to buy it or the attachment has been ineffective or otherwise cumbersome or expensive.

The invention contemplates a structure which eliminates these disadvantages.

It is a primary object of the invention to provide an improved stalk clearing device in the form of an attachment including a pair of stalk engaging members one of which comprises a roll moving downwardly on the side engaging the stalk and the other a spring pressure plate, the roll and the plate defining a fore-and-aft extending stalk-receiving bite substantially in vertical alignment with the plant-receiving passageway.

The device contemplates a simple and inexpensive design and one that includes attaching parts enabling it to be readily attached or detached from a harvester of current construction without materially altering its basic design.

A further object of the invention is to provide a novel aggressive unit wherein the anti-clogging roll is of novel form which permits the passage of rooted stalks and which is effective for drawing uprooted stalks downwardly and to prevent their entry into the harvesting means.

These and other important objects and features inherent in and encompassed by the present invention become apparent from the specification and the drawings, wherein:

FIGURE 1 is a side elevational view of a tractor and harvesting units partially broken away and illustrating the invention applied thereto;

FIGURE 2 is an enlarged sectional view taken substantially on the line 2—2 of FIGURE 1;

FIGURE 3 is a partial longitudinal sectional view taken substantially on the line 3—3 of FIGURE 4, and FIGURE 4 is an enlarged fragmentary plan view of the invention.

FIGURE 5 is a fragmentary side elevational view of a modified form of a holding roll, and FIGURE 6 is an enlarged cross-sectional view in line 6—6 of FIGURE 5 with a portion of the cooperating structure also shown in section.

The basic harvester construction is shown in U.S. Patent 2,654,201. In general, the harvesting unit generally designated 2 chosen for purposes of the present disclosure comprises a frame work generally designated 3 for attaching the harvester unit to a tractor 4' for propulsion over the field, the harvester unit having its length parallel to the line of advance. The unit 2 comprises a basic gathering component 4 which includes a pair of inboard and outboard upright panel sections or supports 5 and 6 defining a picker throat or plant passage generally designated 8. The supports 5 and 6 have front and rear ends 5a, 5b and 6a, 6b respectively. The front end of the component or unit 4 is connected to an inverted U-shaped structural member 9 which has legs 10 connected to the panels 5 and 6 and forwardly of the yoke structure 9 there is provided a plant guide 11 which includes dividers, the plant guide 11 being pivoted at 12 at opposite sides of the passageway and being controlled in disposition by the quadrant and linkage 13 as will be obviously apparent from the drawings.

The inboard side of the machine contains conveying means in the form of a trough 15 with an auger mounted therein which will be readily apparent from the foregoing patent for advancing material to associated receptacle means. Within the throat 8 as best seen in FIGURE 2 there is disposed a harvesting mechanism 16 which includes a diagonally upwardly extending roll 17 driven in an upward direction on its side opposite the spring pressed stripper plate structure 18 which is mounted on the outboard wall 6. It will be realized that the roll 16 and the said stripper plate 18 may be mounted on either wall. The roll 17 and cooperating arcuate portion 22 of the stripper plate 18 are inclined upwardly and rearwardly to strip the cotton from the plant stalks 20 as the unit advances along the row of plants.

The drive to the stripping or harvesting mechanism proceeds from the rear end of the shaft 23 of the stripper roll 17, the shaft 23 being mounted on the support structure or bracket 24 on the machine frame and the rear end of the shaft 23 is connected through the universal joint shaft 25 to a pulley 26 which may be driven from a pulley 27 by a belt 28, the pulley 27 being connected to the power take-off shaft 29 of the tractor.

The invention contemplated herein comprises a novel stalk clearing roll structure 31 comprising a shaft 32, the rear end of which is journalled in bearings 33 upon the support standard or rear bracket 24 directly beneath the shaft 23 of the stripping roll. It will be seen that the rear end of the shaft 32 is provided with a retaining pin 34 so that the shaft may be readily withdrawn by pulling it forwardly from the bearing support 33.

The shaft 32 projects through an opening 35 in the rear transverse wall 36' of the housing structure and has a plurality, preferably three in number, of two vanes 36 extending tangentially outwardly from the shaft 32 and equally spaced therearound and weld-connected thereto as at 37. Each blade, vane or tooth member 36 comprises a generally flat base portion 38 which along its outer edge is provided with a series of outwardly projecting teeth 39, each tooth having a leading edge 40 and a trailing edge 41, the leading edge being angled rearwardly about 45° to the axis of the shaft 32 and the rear trailing edge of each tooth being approximately normal or slightly inclined forwardly at an angle of between 75 and 90° to the axis of the shaft 32. The teeth 39 have pointed outer ends 43 which are adapted to pierce the stalk 20 as the stalk is moving through the plant passageway and it will be readily realized that the rearward inclination of the leading edges 40 of the teeth, which may have an included angle of 120°–150° with respect to the axis of the shaft 32 permits the stalks to advance rearwardly and the substantially normal disposition of the rear side 41 to each tooth prevents the stalk from readily moving forwardly along the roll.

The forward end of the shaft 32 is mounted in a bearing 44 which is carried in a suitable holder or forward bracket 45' which removably mounts on the panel 5 of the present embodiment. Of course, the roll could be placed on the other side of the plant passage and by being appropriately rotated would serve in the same function.

The tooth blades cooperate with a pressure plate structure generally designated 45 which comprises an inwardly convexed plate member 46 which is secured of each end as by welding to the lower end of an arm 47, the upper end of the arm having a pivot portion 48 which pivotally mounts on a generally fore-and-aft axis in a bracket 49, the bracket being suitably secured as by bolts 50 to the associated panel 6. Each arm 47 is pivoted intermediate its ends as at 51 to the inner end of a spring loaded rod 52, which at its opposite end 53 extends through an enlarged opening 54 in the bracket 49 and carries a combination adjusting and stop nut 55 for limiting movement of the arm 47 toward roll 31 attendant to extension of the spring 57 which is compressed between the abutment assembly 58 on the rod 52 and the opposing side 59 of the back wall of the bracket 49. Thus it will be appreciated that by drawing up the nut 55, the action of the pressure shield plate structure 46 is gauged with respect to the periphery of the stalk walking roll.

It will be readily realized that a novel attachment has been provided which can be sold as optional equipment and its removal will not effect the operation of the harvesting mechanism as such.

Referring now to a modification shown in FIGURES 5 and 6, it will be seen that the structure is substantially identical with that shown in the previous embodiment and therefore common parts are identified by the same reference numerals. In this embodiment the stalk engaging clearing roll 31a comprises a body 100 composed of elastomer material such as rubber or the like, said body being substantially cylindrical and having a plurality of generally uniformly spaced longitudinal ribs 102 about the periphery thereof, the forward ends 103 of the ribs terminating short of the forward end 104 of the body portion of the roll and the forward end of the body portion having a generally cylindrical annulus which presents a substantially smooth outer contour 105. This prevents breaking off of the forward ends of the ribs and smoothly admits the stalks in the bite. It will be seen that the roll is provided with a series of radial apertures 106 spaced throughout the length thereof to enhance flexing of the material, the apertures also serving as recipients for branches and the like to increase the aggressiveness of the roll. The body portion of the roll comprises an axial bore 107 which in the present instance is shown as square to interlock with a corresponding 108 portion of the shaft 32. It will be seen that the bore 107 is eccentrically disposed in the cylindrical body portion and that as the roll is rotated in a direction moving the stalks downwardly on its side opposing the associated pressure plate, the bite defined between the stalk clearing roll and the pressure plate is alternately opened and closed and this sequence is synchronously timed with the rate of advance of the harvester along the stalk row. Thus the plants advance incrementally rearwardly and are intermittently drawn downwardly. This same feature applies to the previous embodiment in that the spaces between the vanes open up the bite easing the passage of the plants therethrough.

It will be seen that in all other respects the structure is substantially identical to that shown in the previous embodiment.

What is claimed is:

1. In a harvester adapted to advance over a field of row-planted stalk-borne crops and including inner and outer upstanding supports respectively having front and rear ends, said supports spaced apart transversely to the line of advance to define between them a fore and aft plant-receiving passageway in which crop engaging means is operative to detach crops from the stalks of passageway-received plants as the harvester advances, the improvement residing in a stalk clearing device operative to effect a downward force on the passageway-received stalks to prevent such stalks from clogging the passageway, said device comprising: a rear bracket carried between said supports; a stalk engaging roll rotatable on a generally fore and aft axis below the crop engaging means and a pressure plate disposed side by side with said stalk-engaging roll and defining therewith a fore-and-aft stalk bite substantially in vertical alignment with the plant-receiving passageway, said roll and pressure plate having front and rear ends, said roll having its rear end journalled in the rear bracket and having its front end proximate to the front end of the associated support, a bracket removably mounting the front end of the roll to the front end of the associated support, said crop engaging means including a stripping roll journalled in said rear bracket, gearing means connected to both of said rolls in meshing engagement with each other, said stripping roll having crop engaging peripheral means and driven to rotate in upwardly sweeping engagement to the stalk-borne crops, said gearing means reversing the drive of said stalk engaging roll for effecting a downward sweep thereof in an area opposing the said pressure plate, said pressure plate extending fore and aft and being transversely curved and having a convex side opposing said stalk engaging roll and developing a bite therebetween, and means adjustably mounting the pressure plate for yieldable movement toward and away with respect to said stalk engaging roll, and further characterized in that said stalk engaging roll comprises peripheral surface areas different distances from the center of rotation of the roll to vary the cross-sectional dimension of the bite as the roll rotates.

2. In a harvester adapted to advance over a field of row-planted stalk-borne crops and including inner and outer upstanding supports respectively having front and rear ends, said supports spaced apart transversely to the line of advance to define between them a fore and aft plant-receiving passageway in which crop engaging means is operative to detach crops from the stalks of passageway-received plants as the harvester advances, the improvement residing in a stalk clearing device operative to effect a downward force on the passageway-received stalks to prevent such stalks from clogging the passageway, said device comprising: a rear bracket carried between said supports; a stalk engaging roll rotatable on a generally fore and aft axis below the crop engaging means and a pressure plate disposed side by side with said stalk-engaging roll and defining therewith a fore-and-aft stalk bite substantially in vertical alignment with the plant-receiving passageway, said roll and pressure plate having front and rear ends, said roll having its rear end journalled in the rear bracket and having its front end proximate to the front end of the associated support, a bracket removably mounting the front end of the roll to the front end of the associated support, said crop engaging means including a stripping roll journalled in said rear bracket, gearing means connected to both of said rolls in meshing engagement with each other, said stripping roll having crop engaging peripheral means and driven to rotate in upwardly sweeping engagement to the stalk-borne crops, said gearing means reversing the drive of said stalk engaging roll for effecting a downward sweep thereof in an area opposing the said pressure plate, said pressure plate extending fore and aft and being transversely curved and having a convex side opposing said stalk engaging roll and developing a bite therebetween, and means adjustably mounting the pressure plate for yieldable movement toward and away with respect to said stalk engaging roll and said stalk engaging roll comprises a generally cylindrical body of elastomer material, and said stalk-engaging roll having a shaft extending through and drivingly connected to said body and disposed eccentrically thereof whereby during rotation said stalk engaging roll closes and opens said bite.

3. In a harvester adapted to advance over a field of row-planted stalk-borne crops and including inner and outer upstanding supports respectively having front and rear ends, said supports spaced apart transversely to the line of advance to define between them a fore and aft plant-receiving passageway in which crop engaging means is operative to detach crops from the stalks of passageway-received plants as the harvester advances, the improvement residing in a stalk clearing device operative to effect a downward force on the passageway-received stalks to prevent such stalks from clogging the passageway, said device comprising: a rear bracket carried between said supports; a stalk engaging roll rotatable on a generally fore and aft axis below the crop engaging means and a pressure plate disposed side by side with said stalk-engaging roll and defining therewith a fore-and-aft stalk bite substantially in vertical alignment with the plant-receiving passageway, said roll and pressure plate having front and rear ends, said roll having its rear end journalled in the rear bracket and having its front end proximate to the front end of the associated support, a bracket removably mounting the front end of the roll to the front end of the associated support, said crop engaging means including a stripping roll journalled in said rear bracket, gearing means connected to both of said rolls in meshing engagement with each other, said stripping roll having crop engaging peripheral means and driven to rotate in upwardly sweeping engagement to the stalk-borne crops, said gearing means reversing the drive of said stalk engaging roll for effecting a downward sweep thereof in an area opposing the said pressure plate, said pressure plate extending fore and aft and being transversely curved and having a convex side opposing said stalk engaging roll and developing a bite therebetween, and means adjustably mounting the pressure plate for yieldable movement toward and away with respect to said stalk engaging roll and said stalk-engaging roll comprising a plurality of outwardly extending blades and each blade having a plurality of stalk engaging teeth terminating in sharp points and said teeth having leading edges angled rearwardly with respect to the direction of advance of the harvester and each tooth having a trailing edge disposed substantially normal to the axis of the stalk-engaging roll.

4. In a harvester adapted to advance over a field of row-planted stalk-borne crops and including inner and outer upstanding supports respectively having front and rear ends, said supports spaced apart transversely to the line of advance to define between them a fore and aft plant-receiving passageway in which crop engaging means is operative to detach crops from the stalks of passageway-received plants as the harvester advances, the improvement residing in a stalk clearing device operative to effect a downward force on the passageway-received stalks to prevent such stalks from clogging the passageway, said device comprising: a rear bracket carried between said supports; a stalk engaging roll rotatable on a generally fore and aft axis below the crop engaging means and a pressure plate disposed side by side with said stalk-engaging roll and defining therewith a fore-and-aft stalk bite substantially in vertical alignment with the plant-receiving passageway, said roll and pressure plate having front and rear ends, said roll having its rear end journalled in the rear bracket and having its front end proximate to the front end of the associated support, a bracket removably mounting the front end of the roll to the front end of the associated support, said crop engaging means including a stripping roll journalled in said rear bracket, gearing means connected to both of said rolls in meshing engagement with each other, said stripping roll having crop engaging peripheral means and driven to rotate in upwardly sweeping engagement to the stalk-borne crops, said gearing means reversing the drive of said stalk engaging roll for effecting a downward sweep thereof in an area opposing the said pressure plate, said pressure plate extending fore and aft and being transversely curved and having a convex side opposing said stalk engaging roll and developing a bite therebetween, and means adjustably mounting the pressure plate for yieldable movement toward and away with respect to said stalk engaging roll and further characterized in that said stalk engaging roll comprises an elongated generally cylindrical, resilient eccentrically mounted body so that during rotation it alternately opens and closes said bite.

5. The invention according to claim 4 and said body being of elastomer material and having longitudinal peripheral ribs terminating in forward ends short of the body, and a cylindrical member on the forward end of the body merging with the ribs.

6. In a harvester adapted to advance over a field of row-planted stalk-borne crops and comprising a housing having inner and outer portions, said inner and outer portions spaced apart transversely to the line of advance to define between them a fore and aft plant receiving passageway in which crop engaging means is operative to detach crops from the stalks of passageway-received plants as the harvester advances, the improvement residing in a stalk clearing device operative to effect a downward force on passageway received stalks to prevent such stalks from clogging the passageway, said device comprising: inner and outer side by side stalk engaging members extending lengthwise respectively fore and aft below the crop engaging means and defining a fore and aft stalk bite substantially in vertical alignment with the plant-receiving passageway, one of said members comprising a pressure plate having a convex face facing toward the other member and the other member comprising a stalk-engaging roll, means yieldably mounting said pressure plate from an adjacent housing portion for movement toward and away with respect to the stalk-engaging roll for varying the bite therebetween, means removably mounting said stalk engaging roll on the adjacent housing portion for rotation on a generally fore and aft axis, and drive means for said stalk engaging roll for rotating it in a direction so that the surface portion thereof proximate to the pressure plate moves downwardly in the stalk bite to exert a downward force on stalks received in said bite, said stalk-engaging roll comprising outwardly projecting peripheral elements.

7. The invention according to claim 6 and said elements comprising teeth on said stalk engaging roll having rearwardly inclined leading edges.

8. The invention according to claim 6 and said roll having a body of elastomer material of generally cylindrical contour and said elements formed on said body.

References Cited in the file of this patent

UNITED STATES PATENTS

| | | |
|---|---|---|
| 1,769,104 | Benjamin | July 1, 1930 |
| 1,978,888 | Thomann | Oct. 30, 1934 |
| 2,532,065 | Hyman | Nov. 28, 1950 |
| 2,533,510 | Roscoe | Dec. 12, 1950 |
| 2,834,174 | Suggs et al. | May 13, 1958 |
| 2,834,175 | Knowles | May 13, 1958 |